(12) United States Patent
Long et al.

(10) Patent No.: US 7,914,674 B2
(45) Date of Patent: Mar. 29, 2011

(54) DEVICE FOR REMOVING CONTAMINATION FROM A VEHICLE OIL STREAM

(75) Inventors: Charles F. Long, Pittsboro, IN (US); Katherine M. Klemen, Carmel, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 730 days.

(21) Appl. No.: 11/402,612

(22) Filed: Apr. 12, 2006

(65) Prior Publication Data
US 2007/0241043 A1   Oct. 18, 2007

(51) Int. Cl.
*B01D 35/06* (2006.01)
*F01M 1/10* (2006.01)

(52) U.S. Cl. .............. 210/222; 210/167.03; 210/167.08; 184/6.25; 123/196 A

(58) Field of Classification Search ................... 210/222, 210/167.03, 167.08; 184/6.25; 123/196 A
See application file for complete search history.

(56) References Cited

U.S. PATENT DOCUMENTS

| | | | | |
|---|---|---|---|---|
| 4,470,834 A | * | 9/1984 | Fasanaro et al. | ................. 55/501 |
| 5,294,350 A | * | 3/1994 | Murphy et al. | ................ 210/222 |
| 5,912,369 A | * | 6/1999 | Reeves | ......................... 55/385.1 |
| 6,423,215 B1 | | 7/2002 | Stein | |
| 6,797,044 B2 | * | 9/2004 | Ou Yang et al. | .............. 55/385.6 |
| 2003/0233818 A1 | * | 12/2003 | Hensley | .......................... 55/490 |

FOREIGN PATENT DOCUMENTS

| | | |
|---|---|---|
| DE | 4130987 A1 | 3/1992 |
| DE | 102006005551 A1 | 8/2006 |

* cited by examiner

*Primary Examiner* — David A Reifsnyder
(74) *Attorney, Agent, or Firm* — Quinn Law Group, PLLC

(57) ABSTRACT

A device for removing ferrous particulates from an oil stream within a motor vehicle includes a passage through which the oil stream flows and a magnet disposed within the passage. The passage defines a cavity in which the magnet is housed. The passage defines a substantially ninety-degree bend, such that particles suspended within the oil stream are propelled into the magnet before continuing along the passage. Preferably the device is disposed upstream of vehicle control valves, such that debris is removed from the oil stream prior to travel through the valves. Preferably, the cavity defines an overhang, which may be magnetic, with the overhang securing the magnet within the cavity and preventing particulates from re-entering the oil stream. An opening within the passage preferably defines the ninety-degree bend. The opening may be at least partially defined by the cavity. The magnet is preferably configured to be replaceable, removable, or both.

20 Claims, 1 Drawing Sheet

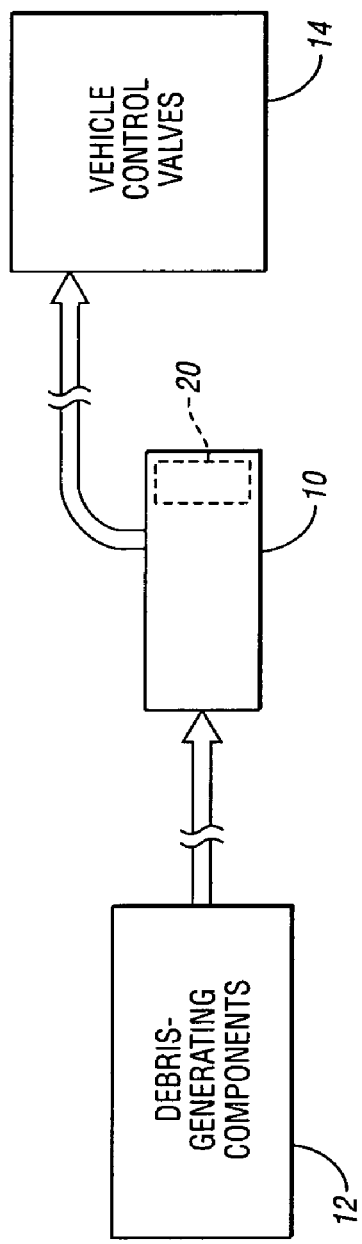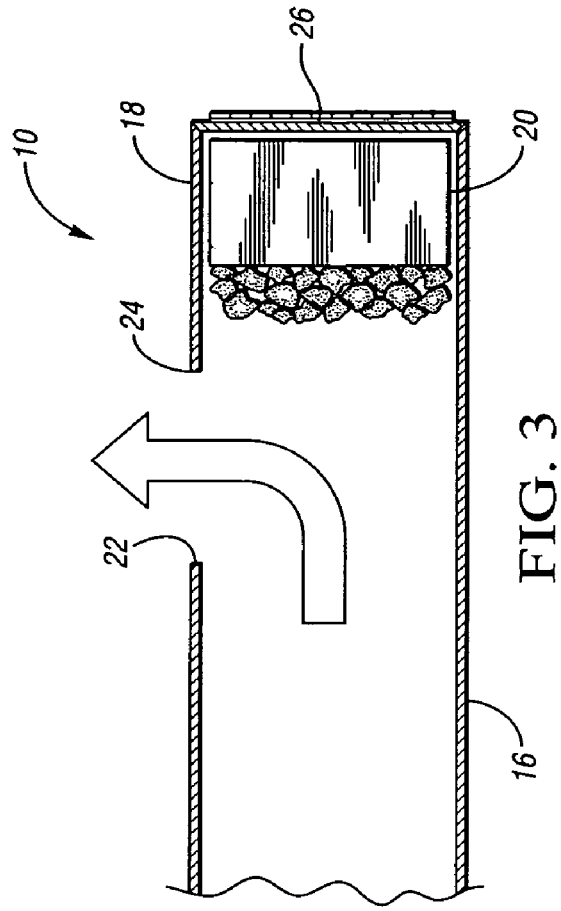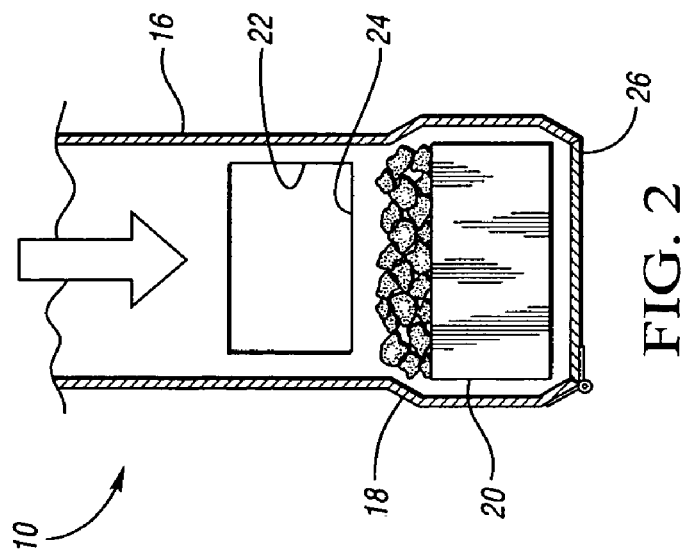

DEVICE FOR REMOVING CONTAMINATION FROM A VEHICLE OIL STREAM

TECHNICAL FIELD

The present invention relates to fluid flow within a motor vehicle, and specifically to a device for capturing and removing contaminants from an oil stream.

BACKGROUND OF THE INVENTION

In a typical motor vehicle, a fluid, particularly oil, travels from a sump in fluid communication with a vehicle transmission through a plurality of vehicle components. While the oil generally flows through a filter between a vehicle transmission and a vehicle pump, there are many parts downstream of the filter which can contaminate the oil, such as front supports and converter housings, among other vehicle components. When these components are new, or when they have worn over time, metal shavings may release from the components to contaminate oil flowing thereby, causing vehicle control valves to stick.

SUMMARY OF THE INVENTION

A device for removing ferrous particulates from an oil stream within a motor vehicle includes a passage through which the oil stream flows and a magnet disposed within the passage. The passage defines a cavity in which the magnet is housed. The passage defines a substantially ninety-degree bend, such that oil flowing ferrous particulates suspended in the oil flowing through the passage are propelled into the magnet before the oil continues along the passage, thereby allowing the magnet to remove the particulates from the oil stream. Preferably the device is disposed upstream of vehicle control valves, such that debris is removed from the oil stream prior to travel through the valves.

Preferably, the cavity defines an overhang, with the overhang securing the magnet within the cavity while also preventing particulates attracted to the magnet from re-entering the oil stream. The overhang may be magnetic. An opening within the passage preferably defines the ninety-degree bend. The opening may be at least partially defined by the cavity. The magnet is preferably configured to be replaceable, removable, or both.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic diagram of an oil flowpath within a motor vehicle, showing the position of a device according to the present invention for removing contaminants from an oil stream;

FIG. 2 is a schematic plan view of the device; and

FIG. 3 is a schematic cross-sectional view of the device.

DESCRIPTION OF THE PREFERRED EMBODIMENTS

Referring to the drawings, wherein like reference numbers refer to like components, FIG. 1 presents a schematic diagram showing the position of a device 10 for removing contaminants from an oil stream. The device 10 is disposed between debris-generating components 12 and vehicle control valves 14. The debris-generating components 12 are vehicle components upstream of the device 10 by which oil flows within a vehicle. For instance, the debris-generating components 12 may be vehicle components disposed between an oil pump and the control valves 14, such as front supports or converter housings. Additionally, a vehicle transmission may be a debris-generating component 12, since not all contamination from the transmission may be removed by a vehicle oil filter.

Turning to FIG. 2, a schematic plan view of the device 10 is shown. The device 10 within a passage 16 through which the oil stream flows. The oil stream is indicated by an arrow in FIGS. 2 and 3. The device 10 includes a cavity 18, within which a magnet 20 is housed. Preferably the cavity 18 has a substantially bulbous shape in at least one direction, as shown in FIG. 2. The magnet 20 is configured to have a width larger than the width of the passage 16 before the cavity 18, i.e., above the cavity 18 in FIG. 2, thereby preventing the magnet 20 from escaping from the cavity 18. An opening 22 within the passage 16 allows oil to continue along a flowpath to the vehicle controls systems 14 (shown in FIG. 1). It should be appreciated that the strength of the magnet 20 will be chosen based on the desired efficiency of the device. For example, if the magnet 20 has a relatively weak strength, it will be less expensive but also less effective than if the magnet 20 has a higher strength.

Turning now to FIG. 3, a schematic cross-sectional view of the device is shown. It can be seen that the passage 16 includes 90 degree bend by which the oil must pass. By including a 90 degree bend, inertial forces propel ferrous particulates from the oil stream into the magnet 20, thereby allowing the magnet 20 to remove ferrous debris imparted into the oil stream by the debris-generating components 12 as discussed with respect to FIG. 1. Within the scope of the invention, "ferrous particulates" include any particulates which are attracted by the magnet 20. Thus, the particulates need not necessarily be iron-based for proper working of the present invention.

The cavity 18 preferably includes an overhang 24. The overhang 24 secures the magnet 20 within the cavity 18 by ensuring the magnet does not escape the cavity 18 through the opening 22, while also increasing the volume of the cavity 18 such that debris can build up on the magnet 20 for some time without requiring replacement of the magnet 20. Additionally, the overhang 24 prevents debris from washing back into the oil stream following removal by the magnet 20. The overhang portion 24 could also be magnetic, thereby increasing the overall efficiency of the device 10 and further preventing debris from re-entering the oil stream.

It can thus be seen that the device 10 provides an effective, magnetic particulate trap for removing particulates from an oil stream downstream of a typical vehicle filter but before vehicle control valves 14. By configuring the device 10 to include a 90 degree bend, inertial forces propel ferrous particulates from the oil stream into the magnet 20. The magnet 20 is preferably configured to be replaceable or removable for easy cleaning. For example, the cavity 18 may include a removable wall 26 hingedly attached with respect to the rest of the cavity 18. To replace or remove the magnet 20, the wall 26 would be rotated to allow access to the magnet 20.

While the best mode for carrying out the invention has been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. A device for removing ferrous particulates from an oil stream within a motor vehicle comprising:
   a passage structure defining a cavity, said oil stream flowing through said passage structure; and
   a magnet housed within said cavity;
   wherein said passage structure defines a substantially ninety-degree bend, such that ferrous particulates suspended within the oil stream flowing through said passage structure are propelled into said magnet before flowing through said bend, thereby allowing said magnet to remove the ferrous particulates from said oil stream; and
   wherein said passage structure defines an overhang;
   wherein said overhang is configured to protrude into said oil stream in a direction opposing the direction of oil flow into said magnet 2. The device of claim 1, wherein said overhang at said bend is configured to secure said magnet within said cavity and to prevent ferrous particulates attracted to said magnet from re-entering said oil stream.

3. The device of claim 2, wherein said overhang is magnetic.

4. The device of claim 1, wherein an opening within said passage structure defines said ninety-degree bend.

5. The device of claim 4, wherein said opening is at least partially defined by passage structure defining said cavity.

6. The device of claim 1, wherein said magnet is replaceable.

7. The device of claim 1, wherein said magnetic is removable.

8. The device of claim 1, wherein said magnet is disposed upstream of vehicle control valves.

9. A device for removing ferrous particulates from an oil stream within a motor vehicle comprising:
   a passage structure through which said oil stream flows; and
   a magnet configured to remove ferrous particulates from said oil stream;
   wherein said passage structure defines an opening configured to define a substantially ninety-degree bend within said passage structure, and wherein said magnet is disposed at said ninety-degree bend, such that ferrous particulates suspended within said oil stream are propelled into said magnet before said oil stream flows through said bend and removed from said oil stream; and
   wherein said passage structure defines an overhang configured to protrude into said oil stream in a direction opposing the direction of oil flow into said magnet, said overhang at least partially defining said opening such that said overhang prevents ferrous particulates from re-entering said oil stream following removal by said magnet.

10. The device of claim 9, wherein said passage structure defines a cavity for housing said magnet.

11. The device of claim 10, wherein said passage structure defining said cavity also defines an overhang, said overhang securing said magnet within said cavity and preventing ferrous particulates attracted to said magnet from re-entering said oil stream.

12. The device of claim 10, wherein said passage structure defining said cavity at least partially defines said opening.

13. The device of claim 9, wherein said magnet is replaceable.

14. The device of claim 9, wherein said magnet is removable.

15. The device of claim 9, wherein said magnet is disposed upstream of vehicle control valves.

16. A device for removing ferrous particulates from an oil stream within a motor vehicle downstream of a vehicle filter, said device disposed downstream of debris-generating vehicle components and upstream of vehicle control valves and comprising:
   a passage structure defining a cavity through which said oil stream flows and an opening within said passage structure before said cavity, said opening configured to define a substantially 90-degree bend through which said oil stream must flow to reach said downstream control valves;
   a magnet disposed within said cavity such that ferrous particulates suspended within said oil stream are propelled into said magnet before flowing through said 90-degree bend, such that said magnet removes said ferrous particulates from said oil stream, thereby preventing contamination of said control valves by said ferrous particulates; and
   wherein said passage structure defining said cavity includes a removable portion such that said magnet can be accessed through said removable protion of said passage structure defining said cavity.

17. The device of claim 16, wherein said passage structure defines an overhang, said overhang securing said magnet within said cavity and preventing ferrous particulates attracted to said magnet from re-entering said oil stream.

18. The device of claim 17, wherein said overhang is magnetic.

19. The device of claim 17, wherein said overhang at least partially defines said opening.

20. The device of claim 16, wherein said removable portion and said magnet are configured such that said magnet is removable from said passage structure.

* * * * *